US012563579B2

(12) United States Patent
Ren

(10) Patent No.: US 12,563,579 B2
(45) Date of Patent: Feb. 24, 2026

(54) INFORMATION PROCESSING METHOD, DEVICE AND READABLE STORAGE MEDIUM

(71) Applicant: DATANG MOBILE COMMUNICATIONS EQUIPMENT CO., LTD., Beijing (CN)

(72) Inventor: Xiaotao Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 322 days.

(21) Appl. No.: 18/261,455

(22) PCT Filed: Dec. 10, 2021

(86) PCT No.: PCT/CN2021/137067
§ 371 (c)(1),
(2) Date: Jul. 13, 2023

(87) PCT Pub. No.: WO2022/151884
PCT Pub. Date: Jul. 21, 2022

(65) Prior Publication Data
US 2024/0080865 A1 Mar. 7, 2024

(30) Foreign Application Priority Data
Jan. 15, 2021 (CN) .......................... 202110057714.6

(51) Int. Cl.
*H04W 72/40* (2023.01)
*H04L 5/00* (2006.01)
*H04W 72/02* (2009.01)

(52) U.S. Cl.
CPC ........... *H04W 72/40* (2023.01); *H04L 5/0037* (2013.01); *H04W 72/02* (2013.01)

(58) Field of Classification Search
CPC ........... H04W 72/40; H04W 15/00037; H04W 72/02
See application file for complete search history.

(56) References Cited

U.S. PATENT DOCUMENTS 10,117,277 B2 * 10/2018 Lee ..................... H04W 72/542
12,335,799 B2 * 6/2025 Jiang ....................... H04W 4/40
(Continued)

FOREIGN PATENT DOCUMENTS

CN 111246483 A 6/2020
CN 111865505 A 10/2020
(Continued)

OTHER PUBLICATIONS

Office Action and search report issued on Aug. 8, 2024 for Chinese Patent Application No. 202110057714.6 and its English translation provided by Applicant's Foreign Counsel.
(Continued)

*Primary Examiner* — Ayaz R Sheikh
(74) *Attorney, Agent, or Firm* — Ladas & Parry, LLP

(57) ABSTRACT

An information processing method, an information processing device and a readable storage medium are provided. The information processing method includes transmitting, by a first terminal, first coordination information to a second terminal. The first coordination information is used by the second terminal to perform resource selection in accordance with the first coordination information, the first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

20 Claims, 3 Drawing Sheets one bit in first coordination information different resource sets indicated through the one bit

| 0 | ⇨ | first resource set |

| 1 | ⇨ | second resource set |

(56) References Cited

U.S. PATENT DOCUMENTS

| | | | | |
|---|---|---|---|---|
| 2018/0192397 A1 | | 7/2018 | Seo | |
| 2018/0288749 A1 | * | 10/2018 | Sun | H04W 72/23 |
| 2018/0317207 A1 | | 11/2018 | Liao et al. | |
| 2020/0029318 A1 | | 1/2020 | Guo | |
| 2020/0077434 A1 | | 3/2020 | Kim et al. | |
| 2020/0229173 A1 | * | 7/2020 | Cao | H04W 72/51 |
| 2020/0229205 A1 | * | 7/2020 | Bharadwaj | H04L 5/0053 |
| 2020/0288433 A1 | * | 9/2020 | Yu | H04W 72/0446 |
| 2020/0305174 A1 | * | 9/2020 | Ganesan | H04W 72/12 |
| 2020/0322897 A1 | * | 10/2020 | Hwang | H04L 1/1861 |
| 2020/0366419 A1 | * | 11/2020 | Panteleev | H04L 5/0051 |
| 2020/0396040 A1 | * | 12/2020 | Miao | H04W 4/40 |
| 2020/0396718 A1 | * | 12/2020 | Luo | H04W 72/0453 |
| 2021/0091901 A1 | * | 3/2021 | Sun | H04W 72/1263 |
| 2021/0105104 A1 | * | 4/2021 | Cao | H04L 1/1854 |
| 2021/0105746 A1 | * | 4/2021 | Sarkis | H04L 1/1812 |
| 2021/0127403 A1 | * | 4/2021 | Ryu | H04B 7/0408 |
| 2021/0153213 A1 | * | 5/2021 | Wang | H04W 40/22 |
| 2021/0204217 A1 | * | 7/2021 | Balasubramanian | |
| | | | | H04W 24/10 |
| 2021/0212051 A1 | * | 7/2021 | Raghavan | H04W 76/14 |
| 2021/0368312 A1 | * | 11/2021 | Zhang | H04W 84/005 |
| 2023/0044879 A1 | * | 2/2023 | Jiao | H04W 72/25 |

FOREIGN PATENT DOCUMENTS

| | | |
|---|---|---|
| CN | 112385251 A | 2/2021 |
| TW | 201946482 A | 12/2019 |

OTHER PUBLICATIONS

LG Electronics; "Feature lead summary for AI 8.11.2.2 Feasibility and benefits for mode 2 enhancements"; #3GPP TSG RAN WG1 #103-e; R1-2009788; Nov. 19, 2020; e-Meeting, Oct. 26-Nov. 13, 2020.

Extended European Search Report for European Patent Application No. 21919074.1 issued by the European Patent Office on May 14, 2024.

"Discussion points for WID objectives" 3GPP TSG RAN Meeting #90-e, RP-202217, e-meeting, Dec. 7-11, 2020, Agenda Item: 9.8.3, Source: Futurewei, Document for: Discussion and decision.

"Discussion on mode 2 enhancements," 3GPP TSG RAN WG1 #103-e, R1-2007689, e-Meeting, Oct. 26-Nov. 13, 2020, Source: vivo, Agenda Item: 8.11.2.2.

"Considerations on Inter-UE Coordination for Mode 2 Enhancements," 3GPP TSG RAN WG1 Meeting #103-E, R1-2007788, e-Meeting, Oct. 26-Nov. 13, 2020, Source: Fujitsu, Agenda Item: 8.11.2.2.

"Discussion on Inter-UE Coordination for Mode 2 Resource Allocation," 3GPP TSG RAN WG1 #103-e, R1-2008447, e-Meeting, Oct. 26-Nov. 13, 2020, Agenda Item: 8.11.2.2, Source: Apple.

"Inter-UE Coordination for Sidelink Mode 2 Resource Allocation," 3GPP TSG RAN WG2 Meeting #113-e, R2-2100576, Online, Jan. 25-Feb. 5, 2021, Source: Fraunhofer IIS, Fraunhofer HHI, Agenda Item: 8.15.3.

International Search Report for PCT Application No. PCT/CN2021/137067 issued on Feb. 28, 2022 and its English Translation provided by WIPO.

Written Opinion for PCT Application No. PCT/CN2021/137067 issued on Feb. 28, 2022 and its English Translation provided by WIPO.

International Preliminary Report on Patentability for PCT Application No. PCT/CN2021/137067 issued on Jul. 4, 2023 and its English Translation provided by WIPO.

"Remaining details of sidelink resource allocation mode 2," 3GPP TSG RAN WG1 Meeting #100bis-e, R1-2001552, E-meeting, Apr. 20-Apr. 30, 2020, Agenda Item: 7.2.4.2.2, Source: Huawei, HiSilicon, all pages.

First Office Action and search report for the corresponding Taiwanese Patent Application No. 111100006 issued by the Taiwanese Patent office on Mar. 20, 2022, and its English translation provided by the foreign associate.

* cited by examiner

INFORMATION PROCESSING METHOD, DEVICE AND READABLE STORAGE MEDIUM

CROSS-REFERENCE TO RELATED APPLICATIONS

This application is the U.S. national phase of PCT Application No. PCT/CN2021/137067 filed on Dec. 10, 2021, which claims the priority of the Chinese patent application No. 202110057714.6 filed in China on Jan. 15, 2021, both of which are incorporated herein by reference in their entireties.

TECHNICAL FIELD

The present disclosure relates to the field of communication technology, in particular to an information processing method, an information processing device and a readable storage medium.

BACKGROUND

In a 5th-Generation (5G) New Radio (NR) Vehicle-to-Everything (V2X) system, terminals directly communicate with each other via a Sidelink. Before the transmission of service data, at first time-frequency resources used for the Sidelink data transmission need to be determined. As a main principle, the time-frequency resources are determined in such a manner as to prevent the occurrence of any collision between the time-frequency resources used by different terminals, thereby to prevent the occurrence of mutual interference.

In the NR V2X, there are two resource scheduling modes. In a resource allocation mode 1, the time-frequency resources used for the Sidelink communication between the terminals are all scheduled by a base station. In a resource allocation mode 2, in the absence of the base station, each terminal selects, on its own initiative, the time-frequency resources used for the Sidelink communication between the terminals.

In the related art, in the resource allocation mode 2, the terminal performs resource exclusion in accordance with its own resource sensing result, so as to exclude conflict resources sensed by the terminal itself. However, apart from the conflict resources sensed by the terminal itself, the terminal further needs to obtain some other conflict resources from the other terminals, and the terminal also needs to exclude these conflict resources between the terminals. Hence, there is an urgent need to provide a scheme to transmit information of the conflict resources between the terminals, so as to effectively assist the terminal to perform the resource exclusion.

SUMMARY

An object of the present disclosure is to provide an information processing method, an information processing device and a readable storage medium, so as to increase a success rate of the transmission of a Sidelink data packet.

In one aspect, the present disclosure provides in some embodiments an information processing method, including transmitting, by a first terminal, first coordination information to a second terminal. The first coordination information is used by the second terminal to perform resource selection in accordance with the first coordination information, the first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

In a possible embodiment of the present disclosure, the first resource set is a resource set preferred by the second terminal for the Sidelink communication, and the second resource set is a resource set not preferred by the second terminal for the Sidelink communication.

In a possible embodiment of the present disclosure, the resource set corresponding to the time-frequency resource indication information carried in the first coordination information is indicated through at least one bit.

In a possible embodiment of the present disclosure, one bit is used to indicate that the time-frequency resource indication information carried in the first coordination information is the time-frequency resource indication information of the first resource set or the time-frequency resource indication information of the second resource set; or two bits are used to indicate that the time-frequency resource indication information carried in the first coordination information is the time-frequency resource indication information of the first resource set, or the time-frequency resource indication information of the second resource set, or the time-frequency resource indication information of the third resource set; or three bits are used to indicate that the time-frequency resource indication information carried in the first coordination information is at least one of the time-frequency resource indication information of the first resource set, the time-frequency resource indication information of the second resource set, or the time-frequency resource indication information of the third resource set.

In a possible embodiment of the present disclosure, the first coordination information further includes at least one of Reference Signal Received Power (RSRP) information, RSRP threshold information, priority information, or zone identity information of at least one resource in at least one of the first resource set, the second resource set or the third resource set.

In a possible embodiment of the present disclosure, the RSRP information is RSRP information of a resource meeting a first predetermined condition, and the RSRP information includes RSRP intensity information or RSRP bitmap information.

In a possible embodiment of the present disclosure, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

In a possible embodiment of the present disclosure, the RSRP intensity information includes RSRP intensity information of a sub-channel or RSRP intensity information of a sub-channel set.

In a possible embodiment of the present disclosure, the first threshold is carried in the first coordination information, configured through first signaling, preconfigured, or indicated through a first indication. The first indication is used to indicate that the first threshold is determined in accordance with a correspondence between a threshold and priority information, and the priority information indicates a priority of a to-be-transmitted data packet or a priority of a user.

In a possible embodiment of the present disclosure, the first coordination information is carried through Sidelink Control Information (SCI), Downlink Control Information (DCI), or Radio Resource Control (RRC) signaling.

In a possible embodiment of the present disclosure, when the first coordination information further includes the RSRP information, the resource set corresponding to the time-frequency resource indication information carried in the first coordination information is indicated through SCI, and the RSRP information is indicated through RRC signaling.

In another aspect, the present disclosure provides in some embodiments an information processing method, including: receiving, by a second terminal, first coordination information transmitted by a first terminal; and performing, by the second terminal, resource selection in accordance with the first coordination information. The first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

In a possible embodiment of the present disclosure, the first resource set is a resource set preferred by the second terminal for the Sidelink communication, and the second resource set is a resource set not preferred by the second terminal for the Sidelink communication.

In a possible embodiment of the present disclosure, the resource set corresponding to the time-frequency resource indication information carried in the first coordination information is indicated by the first terminal through at least one bit.

In a possible embodiment of the present disclosure, prior to performing, by the second terminal, the resource selection in accordance with the first coordination information, the information processing method further includes determining the resource set corresponding to the time-frequency resource indication information carried in the first coordination information in accordance with the at least one bit.

In a possible embodiment of the present disclosure, the first coordination information further includes at least one of RSRP information, RSRP threshold information, priority information, or zone identity information of at least one resource in at least one of the first resource set, the second resource set or the third resource set.

In a possible embodiment of the present disclosure, the RSRP information is RSRP information of a resource meeting a first predetermined condition, and the RSRP information includes RSRP intensity information or RSRP bitmap information.

In a possible embodiment of the present disclosure, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

In a possible embodiment of the present disclosure, the receiving, by the second terminal, the first coordination information from the first terminal includes receiving, by the second terminal, the first coordination information carried through any one of SCI, DCI or signaling.

In a possible embodiment of the present disclosure, when the first coordination information further includes the RSRP information, the receiving, by the second terminal, the first coordination information from the first terminal includes receiving the resource set corresponding to the time-frequency resource indication information carried in the first coordination information indicated through SCI, and receiving the RSRP information indicated through RRC signaling.

In yet another aspect, the present disclosure provides in some embodiments an information processing device for a first terminal, including a memory, a transceiver and a processor. The memory is configured to store therein a computer program. The transceiver is configured to transmit and receive data under the control of the processor. The processor is configured to read the computer program in the memory to transmit first coordination information to a second terminal. The first coordination information is used by the second terminal to perform resource selection in accordance with the first coordination information, the first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

In a possible embodiment of the present disclosure, the first resource set is a resource set preferred by the second terminal for the Sidelink communication, and the second resource set is a resource set not preferred by the second terminal for the Sidelink communication.

In a possible embodiment of the present disclosure, the resource set corresponding to the time-frequency resource indication information carried in the first coordination information is indicated through at least one bit.

In a possible embodiment of the present disclosure, one bit is used to indicate that the time-frequency resource indication information carried in the first coordination information is the time-frequency resource indication information of the first resource set or the time-frequency resource indication information of the second resource set; or two bits are used to indicate that the time-frequency resource indication information carried in the first coordination information is the time-frequency resource indication information of the first resource set, or the time-frequency resource indication information of the second resource set, or the time-frequency resource indication information of the third resource set; or three bits are used to indicate that the time-frequency resource indication information carried in the first coordination information is at least one of the time-frequency resource indication information of the first resource set, the time-frequency resource indication information of the second resource set, or the time-frequency resource indication information of the third resource set.

In a possible embodiment of the present disclosure, the first coordination information further includes at least one of RSRP information, RSRP threshold information, priority information, or zone identity information of at least one resource in at least one of the first resource set, the second resource set or the third resource set.

In a possible embodiment of the present disclosure, the RSRP information is RSRP information of a resource meeting a first predetermined condition, and the RSRP information includes RSRP intensity information or RSRP bitmap information.

In a possible embodiment of the present disclosure, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

In a possible embodiment of the present disclosure, the RSRP intensity information includes RSRP intensity information of a sub-channel or RSRP intensity information of a sub-channel set.

In a possible embodiment of the present disclosure, the first threshold is carried in the first coordination information, configured through first signaling, preconfigured, or indicated through a first indication. The first indication is used to indicate that the first threshold is determined in accordance with a correspondence between a threshold and priority information, and the priority information indicates a priority of a to-be-transmitted data packet or a priority of a user.

In a possible embodiment of the present disclosure, the first coordination information is carried through SCI, DCI, or RRC signaling.

In a possible embodiment of the present disclosure, when the first coordination information further includes the RSRP information, the resource set corresponding to the time-frequency resource indication information carried in the first coordination information is indicated through SCI, and the RSRP information is indicated through RRC signaling.

In still yet another aspect, the present disclosure provides in some embodiments an information processing device for a second terminal, including a memory, a transceiver and a processor. The memory is configured to store therein a computer program. The transceiver is configured to transmit and receive data under the control of the processor. The processor is configured to read the computer program in the memory to: receive first coordination information transmitted by a first terminal; and perform resource selection in accordance with the first coordination information. The first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

In a possible embodiment of the present disclosure, the first resource set is a resource set preferred by the second terminal for the Sidelink communication, and the second resource set is a resource set not preferred by the second terminal for the Sidelink communication.

In a possible embodiment of the present disclosure, the resource set corresponding to the time-frequency resource indication information carried in the first coordination information is indicated by the first terminal through at least one bit.

In a possible embodiment of the present disclosure, the processor is further configured to determine the resource set corresponding to the time-frequency resource indication information carried in the first coordination information in accordance with the at least one bit.

In a possible embodiment of the present disclosure, the first coordination information further includes at least one of RSRP information, RSRP threshold information, priority information, or zone identity information of at least one resource in at least one of the first resource set, the second resource set or the third resource set.

In a possible embodiment of the present disclosure, the RSRP information is RSRP information of a resource meeting a first predetermined condition, and the RSRP information includes RSRP intensity information or RSRP bitmap information.

In a possible embodiment of the present disclosure, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

In a possible embodiment of the present disclosure, the processor is further configured to receive the first coordination information carried through any one of SCI, DCI or signaling.

In a possible embodiment of the present disclosure, when the first coordination information further includes the RSRP information, the processor is further configured to receive the resource set corresponding to the time-frequency resource indication information carried in the first coordination information indicated through SCI, and receive the RSRP information indicated through RRC signaling.

In still yet another aspect, the present disclosure provides in some embodiments an information processing device for a first terminal, including a first transmission unit configured to transmit first coordination information to a second terminal. The first coordination information is used by the second terminal to perform resource selection in accordance with the first coordination information, the first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

In still yet another aspect, the present disclosure provides in some embodiments an information processing device for a second terminal, including: a first reception unit configured to receive first coordination information transmitted by a first terminal; and a first selection unit configured to perform resource selection in accordance with the first coordination information. The first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

In still yet another aspect, the present disclosure provides in some embodiments a processor-readable storage medium storing therein a computer program. The computer program is used to be executed by a processor to implement the above-mentioned information processing method.

According to the embodiments of the present disclosure, the first terminal transmits the first coordination information to the second terminal, and the second terminal performs the resource selection in accordance with the first coordination information, so that the second terminal may consider the resource coordination between the terminals during the resource selection. As a result, in the embodiments of the present disclosure, it is able to reduce a probability of a data packet transmission failure due to a resource collision, thereby to increase a success rate of the transmission of a Sidelink data packet.

DETAILED DESCRIPTION

Figure 1:
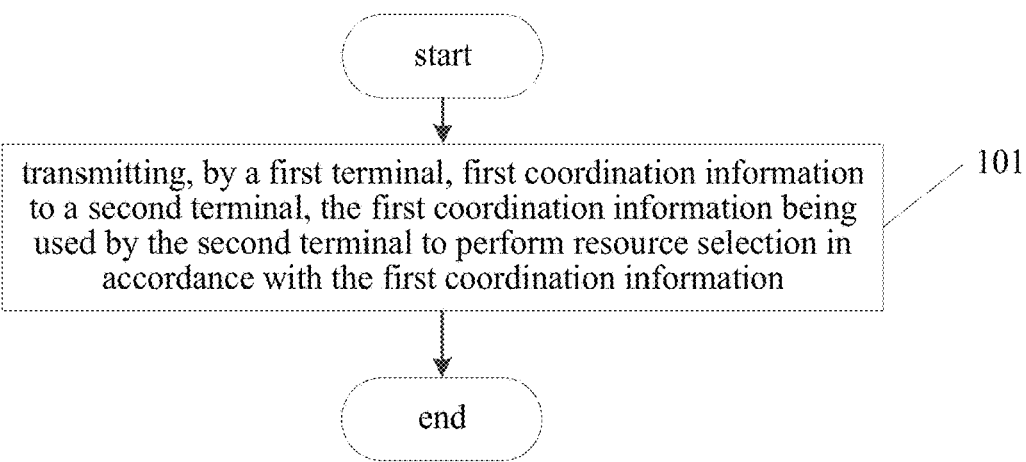
FIG. 1 is a flow chart of an information processing method according to an embodiment of the present disclosure.

The expression "and/or" in the embodiments of the present disclosure may be merely used to describe the relationship between objects, and it may include three relationships. For example, "A and/or B" may represent that, there is only A, there are both A and B, and there is only B. Further, the symbol "/" usually refers to "or".

The expression "a plurality of" refers to two or more, and the other quantifiers are similar.

In the following, the present disclosure will be described in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide an information processing method, an information processing device and a readable storage medium, so as to increase a success rate of the transmission of a Sidelink data packet.

The method and the device are provided on the basis of a same inventive concept, and a principle of the method for solving the problem is similar to that of the device, so the implementation of the device may refer to that of the method.

Schemes in the embodiments of the present disclosure may be applied to various systems, especially a 5G system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or 5th-Generation (5G) New Radio (NR) system. Each of these systems includes a terminal device and a network device. Each system further includes a core network part, e.g., an Evolved Packet System (EPS) or 5G system (5GS).

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be further particularly defined herein.

As shown in FIG. 1, the present disclosure provides in some embodiments an information processing method, which includes Step 101 of transmitting, by a first terminal, first coordination information to a second terminal. The first coordination information is used by the second terminal to perform resource selection in accordance with the first coordination information, the first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

To be specific, the first resource set is a resource set preferred by the second terminal for the Sidelink communication, and the second resource set is a resource set not preferred by the second terminal for the Sidelink communication.

In actual use, information of resources in the first resource set and the second resource set is determined by the first terminal itself in accordance with an actual condition. When the first resource set is a resource set preferred by the second terminal for the Sidelink communication and the second resource set is a resource set not preferred by the second terminal for the Sidelink communication, the first resource set is a set of resources preferred by the first terminal to be used by the second terminal for the Sidelink communication, and the second resource set is a set of resources non-preferred by the first terminal to be used by the second terminal for the Sidelink communication. Alternatively, to put it further, when the second terminal performs the resource selection, a usage priority of the first resource set is higher than a usage priority of the second resource set, i.e., the second terminal preferentially selects resources in the first resource set, and then selects resources in the second resource set or does not select resources in the second resource set.

In order to enable the second terminal to accurately obtain the resource set corresponding to the time-frequency resource indication information carried in the first coordination information, the resource set corresponding to the time-frequency resource indication information carried in the first coordination information is indicated by the first terminal through at least one bit.

To be specific, the first terminal indicates, through one bit, that the time-frequency resource indication information carried in the first coordination information is the time-frequency resource indication information of the first resource set or the time-frequency resource indication information of the second resource set. Alternatively, the first terminal indicates, through two bits, that the time-frequency resource indication information carried in the first coordination information is the time-frequency resource indication information of the first resource set, the time-frequency resource indication information of the second resource set, or the time-frequency resource indication information of the third resource set. Alternatively, the first terminal indicates, through three bits, that the time-frequency resource indication information carried in the first coordination information is at least one of the time-frequency resource indication information of the first resource set, the time-frequency resource indication information of the second resource set, or the time-frequency resource indication information of the third resource set.

To be specific, in the embodiments of the present disclosure, methods for indicating the resource set will be described as follows.

Figure 2:
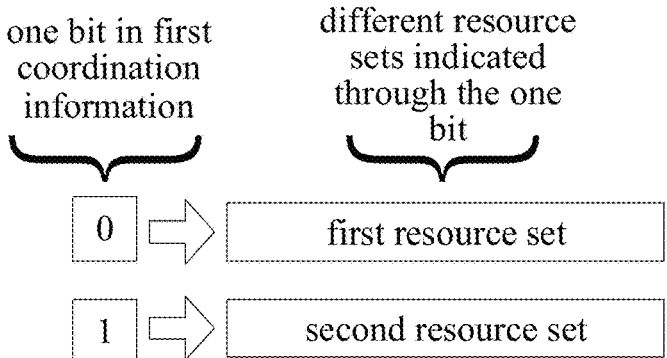
FIG. 2 is a schematic view showing an indication mode of a resource set according to an embodiment of the present disclosure.

As a first resource set indication method, one bit in the first coordination information is used to indicate whether the time-frequency resource indication information of the first resource set or the time-frequency resource indication information of the second resource set is carried in the first coordination information. As shown in FIG. 2, 0 represents that the time-frequency resource indication information of the first resource set is carried, and 1 represents that the time-frequency resource indication information of the second resource set is carried, and vice versa. When this one bit is not included, it means that the time-frequency resource indication information of the third resource set is carried.

Figure 3:
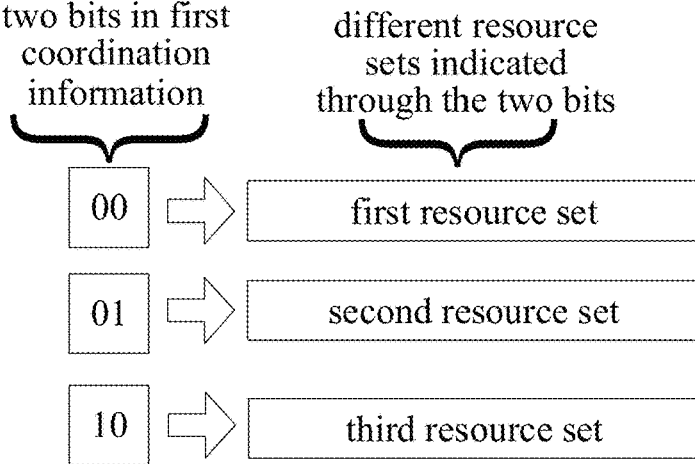
FIG. 3 is another schematic view showing the indication mode of the resource set according to an embodiment of the present disclosure.

As a second resource set indication method, two bits in the first coordination information are used to indicate whether the time-frequency resource indication information of the first resource set, the time-frequency resource indication information of the second resource set or the time-frequency resource indication information of the third resource set is carried in the first coordination information. As shown in FIG. 3, 00 represents that the time-frequency resource indication information of the first resource set is carried, 01 represents that the time-frequency resource indication information of the second resource set is carried, and 10 represents that the time-frequency resource indication information of the third resource set is carried.

It should be appreciated that, in the embodiments of the present disclosure, when one or two bits are included in the first coordination information, it means that one piece of first coordination information merely indicates the time-frequency resource indication information of any of the first resource set, the second resource set and the third resource set, rather than the time-frequency resource indication information of more than one resource set simultaneously.

Figure 4:
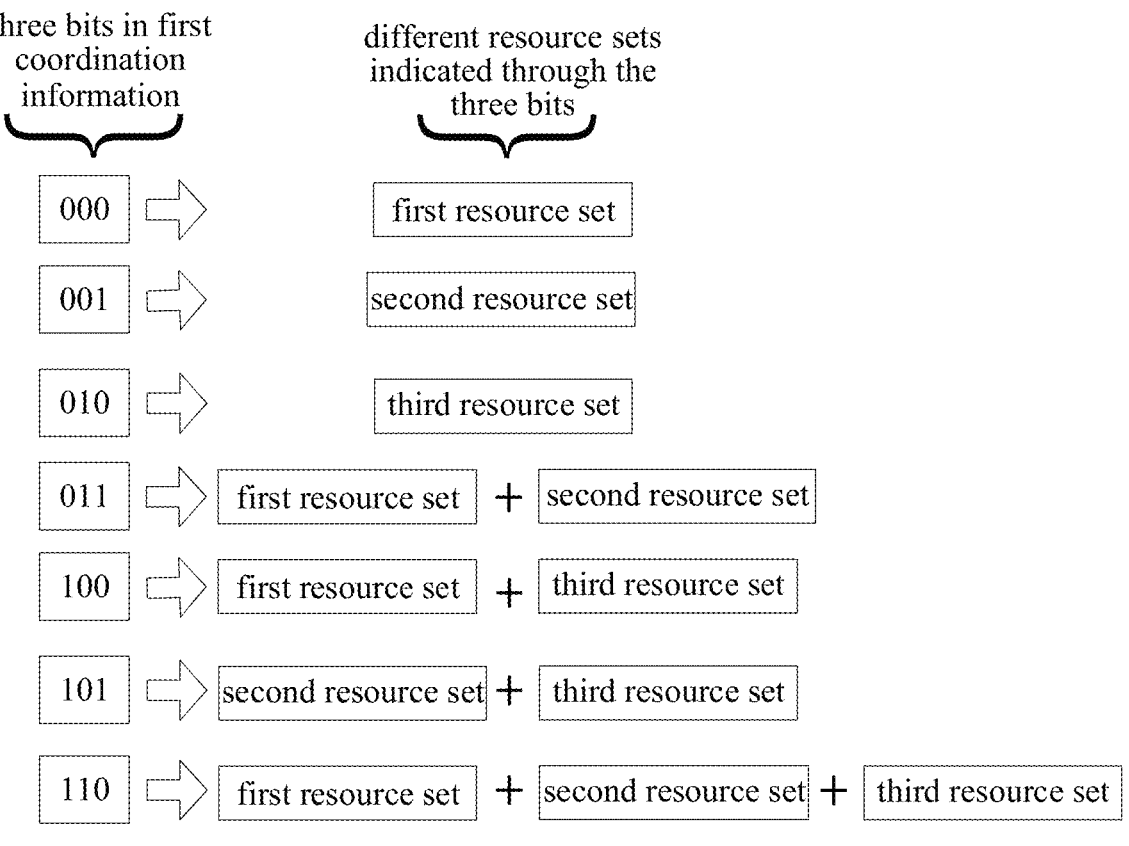
FIG. 4 is yet another schematic view showing the indication mode of the resource set according to an embodiment of the present disclosure.

As a third resource set indication method, i.e., a method for indicating a plurality of resource sets, three bits in the first coordination information are used to indicate that the time-frequency resource indication information of a combination in the first resource set, the second resource set or the third resource set is carried in the first coordination information. As shown in FIG. 4, 000 represents that the time-frequency resource indication information of the first resource set is carried, 001 represents that the time-frequency resource indication information of the second resource set is carried, 010 represents that the time-frequency resource indication information of the third resource set is carried, 011 represents that the time-frequency resource indication information of the first resource set and the second resource set is carried, 100 represents that the time-frequency resource indication information of the first resource set and the third resource set is carried, 101 represents that the time-frequency resource indication information of the second resource set and the third resource set is carried, and 110 represents that the time-frequency resource indication information of the first resource set, the second resource set and the third resource set is carried.

In the embodiments of the present disclosure, when three bits in the first coordination information are used to indicate the time-frequency resource indication information of any combination among the first resource set, the second resource set and the third resource set, it means that the three bits are used to indicate the time-frequency resource indication information of one resource set or a plurality of resource sets simultaneously.

Based on the above methods, it is able to flexibly indicate which type of resource set is included in the coordination information transmitted between the terminals with an excellent coordination effect, thereby to reduce the probability of the data packet transmission failure due to the resource collision, and increase the success rate of the transmission of the Sidelink data packet.

In the embodiments of the present disclosure, the first coordination information is carried through any of SCI (e.g., SCI format 1B), DCI, or RRC signaling (e.g., Uu RRC signaling or PC5 RRC signaling).

In addition, the first coordination information is further carried through one or more carriers. For example, when the first coordination information further includes RSRP information, the resource set corresponding to the time-frequency resource indication information carried in the first coordination information is indicated through SCI, and the RSRP information is indicated through RRC signaling.

In the embodiments of the present disclosure, it is able to flexibly transmit the first coordination information through SCI, DCI or RRC, thereby to reduce the probability of the data packet transmission failure due to the resource collision, and increase the success rate of the transmission of the Sidelink data packet.

According to the embodiments of the present disclosure, the first terminal transmits the first coordination information to the second terminal, and the second terminal performs the resource selection in accordance with the first coordination information, so that the second terminal considers the resource coordination between the terminals during the resource selection. As a result, it is able to reduce the probability of the data packet transmission failure due to the resource collision, thereby to increase the success rate of the transmission of a Sidelink data packet.

Based on the above, the first coordination information further includes at least one of RSRP information, RSRP threshold information, priority information, or zone identity (ID) information of at least one resource in at least one of the first resource set, the second resource set or the third resource set. The priority information includes a priority of a user or a data packet.

The RSRP information is RSRP information of a resource meeting a first predetermined condition, and the RSRP information includes RSRP intensity information or RSRP bitmap information. The RSRP intensity information includes RSRP intensity information of a sub-channel or RSRP intensity information of a sub-channel set. The RSRP bitmap information refers to information indicating whether an RSRP value of one or more resources exceeds a certain threshold. When the RSRP value of a resource exceeds the threshold, a bit corresponding to the resource is marked as 1, and when the RSRP value of the resource does not exceed the threshold, the bit corresponding to the resource is marked as 0. The bits corresponding to a plurality of resources together form the RSRP bitmap information.

To be specific, when the RSRP information is RSRP information of the resource meeting the first predetermined condition, there exists any one of the following conditions: that the RSRP information is RSRP intensity information of at least one resource with a highest RSRP intensity; or that the RSRP information is RSRP intensity information of at least one resource with a lowest RSRP intensity; or that the RSRP information is RSRP bitmap information of at least one resource whose RSRP intensity is greater than or equal to a first threshold; or that the RSRP information is RSRP bitmap information of at least one resource whose RSRP intensity is smaller than the first threshold.

In actual use, the first threshold is carried in the first coordination information, configured through first signaling (e.g., RRC signaling), preconfigured, or indicated through a first indication. The first indication is used to indicate that the first threshold is determined in accordance with a correspondence between a threshold and priority information, and the priority information indicates a priority of a to-be-transmitted data packet or a priority of a user.

Through the above-mentioned method for configuring the first threshold for the RSRP information of the coordination resource, the first threshold information is indicated in the first coordination information or any other signaling, or the first threshold is preconfigured. In this way, it is able to configure the first threshold flexibly, thereby to reduce the probability of the data packet transmission failure due to the resource collision, and increase the success rate of the transmission of the Sidelink data packet.

In the embodiments of the present disclosure, when the RSRP information includes the RSRP intensity information, there are the following indication modes.

In a first RSRP intensity information indication mode, the first coordination information includes the RSRP intensity information of each resource in at least one resource set. In a second RSRP intensity information indication mode, the first coordination information includes the RSRP intensity information of N resources with highest RSRP intensity in at least one resource set, where N is a positive integer greater than or equal to 1. In a third RSRP intensity information indication mode, the first coordination information includes the RSRP intensity information of N resources with lowest RSRP intensity in at least one resource set, where N is a positive integer greater than or equal to 1. The RSRP intensity information of the resource refers to RSRP intensity information of a sub-channel or a sub-channel set.

Through the above-mentioned method for indicating the RSRP information of the coordination resource, the RSRP intensity information of the resource set is indicated in the first coordination information. As a result, it is able to flexibly indicate the RSRP intensity information of each sub-channel in the resource set with an excellent coordination effect, thereby to reduce the probability of the data packet transmission failure due to the resource collision, and increase the success rate of the transmission of the Sidelink data packet.

As shown in Table 1, the first coordination information transmitted by terminal A to terminal B carries the second resource set, i.e., the resource set not preferred by the terminal B for the Sidelink communication. The second resource set includes 6 sub-channels, i.e., sub-channels 1 to 6. In the first indication mode, the RSRP intensity information of all the sub-channels is indicated. In the second indication mode, merely the RSRP information of 3 sub-channels with the highest RSRP intensity, i.e., the RSRP intensity information of sub-channels 1, 4 and 5, is indicated. In the third indication mode, merely the RSRP information of 3 sub-channels with the lowest RSRP intensity, i.e., the RSRP intensity information of sub-channels 2, 3 and 6, is indicated.

TABLE 1

| Mode | Sub-channel 1 | Sub-channel 2 | Sub-channel 3 | Sub-channel 4 | Sub-channel 5 | Sub-channel 6 | Predetermined threshold |
|---|---|---|---|---|---|---|---|
| First indication mode (full set) | −75 dBm | −80 dBm | −84 dBm | −69 dBm | −71 dBm | −90 dBm | Not involved |
| Second indication mode (highest, N = 3) | −75 dBm | \ | \ | −69 dBm | −71 dBm | \ | Not involved |
| Third indication | \ | −80 dBm | −84 dBm | \ | \ | −90 dBm | Not involved |

TABLE 1-continued

| Mode | Sub-channel 1 | Sub-channel 2 | Sub-channel 3 | Sub-channel 4 | Sub-channel 5 | Sub-channel 6 | Predetermined threshold |
|------|------|------|------|------|------|------|------|
| mode (lowest, N = 3) | | | | | | | |

In the embodiments of the present disclosure, the RSRP information includes the RSRP bitmap information. The RSRP bitmap information refers to information indicating whether RSRP values of a plurality of resources exceed a certain threshold. When the RSRP value of a resource exceeds the threshold, a bit corresponding to the resource is marked as 1, and when the RSRP value of the resource does not exceed the threshold, the bit corresponding to the resource is marked as 0. The bits of the plurality of resources together form the bitmap information. The threshold is set according to the practical need. To be specific, the RSRP bitmap information is indicated in the following modes. In a first RSRP bitmap information indication mode, the first 6. In the first indication mode, the sub-channels in the 6 sub-channels whose RSRP intensity is greater than or equal to the first threshold H (−80 dBm) are indicated. For the sub-channel whose RSRP intensity is greater than or equal to the first threshold H, the indication information is "1", and for the sub-channel whose RSRP intensity is smaller than the first threshold H, the indication information is "0". In the second indication mode, the sub-channels in the 6 sub-channels whose RSRP intensity is smaller than the first threshold H (−80 dBm) are indicated. For the sub-channel whose RSRP intensity is smaller than the firs threshold H, the indication information is "1", and for the sub-channel whose RSRP intensity is greater than or equal to the first threshold H, the indication information is "0".

TABLE 2

| Mode | Sub-channel 1 | Sub-channel 2 | Sub-channel 3 | Sub-channel 4 | Sub-channel 5 | Sub-channel 6 | Predetermined threshold |
|------|------|------|------|------|------|------|------|
| First indication mode (greater than or equal to the first threshold H) | 1 | 1 | 0 | 1 | 1 | 0 | −80 dBm |
| Second indication mode (smaller than the first threshold H) | 0 | 0 | 1 | 0 | 0 | 1 | −80 dBm | coordination information includes information of a resource whose RSRP intensity is greater than or equal to a first threshold H in at least one resource set, and RSRP bitmap information of at least one resource whose RSRP intensity is greater than or equal to the first threshold H. In a second RSRP bitmap information indication mode, the first coordination information includes information of a resource whose RSRP intensity is smaller than or equal to the first threshold H in at least one resource set, and RSRP bitmap information of at least one resource whose RSRP intensity is smaller than or equal to the first threshold H.

The RSRP intensity information of the resource refers to RSRP intensity information of a sub-channel or a sub-channel set.

Through the above-mentioned method for indicating the RSRP information of the coordination resource, the RSRP bitmap information of the resource set is indicated in the first coordination information. As a result, it is able to flexibly indicate the RSRP bitmap information of each sub-channel in the resource set with an excellent coordination effect, thereby to reduce the probability of the data packet transmission failure due to the resource collision, and increase the success rate of the transmission of the Sidelink data packet.

Figure 5:
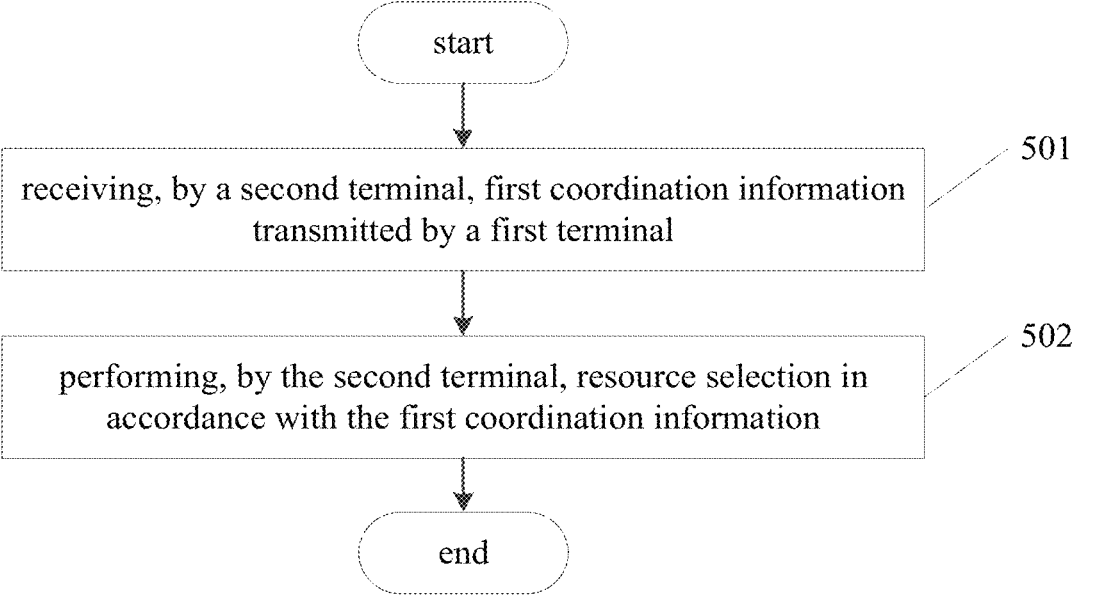
FIG. 5 is another flow chart of the information processing method according to an embodiment of the present disclosure.

As shown in Table 2, the first coordination information transmitted by terminal A to terminal B carries the second resource set, i.e., the resource set not preferred by the terminal B for the Sidelink communication. The second resource set includes 6 sub-channels, i.e., sub-channels 1 to As shown in FIG. 5, the present disclosure provides in some embodiments an information processing method, which includes the following steps.

Step 501: receiving, by a second terminal, first coordination information transmitted by a first terminal.

As mentioned hereinabove, the first coordination information is carried through any one of SCI, DCI or signaling.

In this step, the second terminal receives the first coordination information carried through any of the above.

Step 502: performing, by the second terminal, resource selection in accordance with the first coordination information.

The first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

To be specific, the first resource set is a resource set preferred by the second terminal for the Sidelink communication, and the second resource set is a resource set not preferred by the second terminal for the Sidelink communication.

The resource set corresponding to the time-frequency resource indication information carried in the first coordination information is indicated by the first terminal through at least one bit. In order to improve the resource selection efficiency, the second terminal further determines the resource set corresponding to the time-frequency resource indication information carried in the first coordination information in accordance with the at least one bit. When one bit is adopted and it has a value of 0, it means that the time-frequency resource indication information of the first resource set is carried, and when the bit has a value of 1, it means that the time-frequency resource indication information of the second resource set is carried.

The first coordination information further includes at least one of RSRP information, RSRP threshold information, priority information, or zone identity information of at least one resource in at least one of the first resource set, the second resource set or the third resource set.

The RSRP information is RSRP information of a resource meeting a first predetermined condition, and the RSRP information includes RSRP intensity information or RSRP bitmap information.

When the RSRP information is the RSRP information of the resource meeting the first predetermined condition, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

Based on the above, when the first coordination information further includes the RSRP information, the second terminal receives the resource set corresponding to the time-frequency resource indication information carried in the first coordination information indicated through SCI, and receives the RSRP information indicated through RRC signaling.

According to the embodiments of the present disclosure, the first terminal transmits the first coordination information to the second terminal, and the second terminal performs the resource selection in accordance with the first coordination information, so that the second terminal considers the resource coordination between the terminals during the resource selection. As a result, it is able to reduce the probability of the data packet transmission failure due to the resource collision, thereby to increase the success rate of the transmission of the Sidelink data packet.

Figure 6:
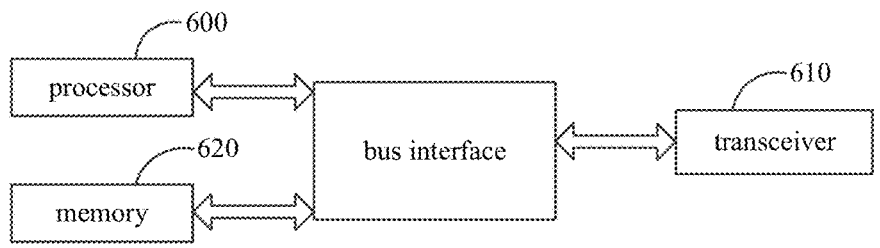
FIG. 6 is a schematic view showing an information processing device according to an embodiment of the present disclosure.

As shown in FIG. 6, the present disclosure further provides in some embodiments an information processing device for a first terminal, which includes a processor 600, a memory 620 and a transceiver 610. The processor 600 is configured to read a program in the memory 620, so as to transmit first coordination information to a second terminal. The first coordination information is used by the second terminal to perform resource selection in accordance with the first coordination information, the first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict. The transceiver 610 is configured to receive and transmit data under the control of the processor 600.

In FIG. 6, bus architecture may include a number of buses and bridges connected to each other, so as to connect various circuits for one or more processors 600 and one or more memories 020. In addition, as is known in the art, the bus architecture may be used to connect any other circuits, such as a circuit for a peripheral device, a circuit for a voltage stabilizer and a power management circuit. A bus interface may be provided, and the transceiver 610 may consist of a plurality of elements, i.e., a transmitter and a receiver for communication with any other devices over a transmission medium. The processor 600 may take charge of managing the bus architecture as well as general processings. The memory 620 may store therein data for the operation of the processor 600.

In a possible embodiment of the present disclosure, the processor 660 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

The processor 600 may take charge of managing the bus architecture as well as general processings. The memory 620 may store therein data for the operation of the processor 600.

In a possible embodiment of the present disclosure, the first resource set is a resource set preferred by the second terminal for the Sidelink communication, and the second resource set is a resource set not preferred by the second terminal for the Sidelink communication.

In a possible embodiment of the present disclosure, the resource set corresponding to the time-frequency resource indication information carried in the first coordination information is indicated through at least one bit.

In a possible embodiment of the present disclosure, one bit is used to indicate that the time-frequency resource indication information carried in the first coordination information is the time-frequency resource indication information of the first resource set or the time-frequency resource indication information of the second resource set; or two bits are used to indicate that the time-frequency resource indication information carried in the first coordination information is the time-frequency resource indication information of the first resource set, or the time-frequency resource indication information of the second resource set, or the time-frequency resource indication information of the third resource set; or three bits are used to indicate that the time-frequency resource indication information carried in the first coordination information is at least one of the time-frequency resource indication information of the first resource set, the time-frequency resource indication information of the second resource set, or the time-frequency resource indication information of the third resource set.

In a possible embodiment of the present disclosure, the first coordination information further includes at least one of RSRP information, RSRP threshold information, priority information, or zone identity information of at least one resource in at least one of the first resource set, the second resource set or the third resource set.

In a possible embodiment of the present disclosure, the RSRP information is RSRP information of a resource meeting a first predetermined condition, and the RSRP information includes RSRP intensity information or RSRP bitmap information.

In a possible embodiment of the present disclosure, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

In a possible embodiment of the present disclosure, the RSRP intensity information includes RSRP intensity information of a sub-channel or RSRP intensity information of a sub-channel set.

In a possible embodiment of the present disclosure, the first threshold is carried in the first coordination information, configured through first signaling, preconfigured, or indicated through a first indication. The first indication is used to indicate that the first threshold is determined in accordance with a correspondence between a threshold and priority information, and the priority information indicates a priority of a to-be-transmitted data packet or a priority of a user.

In a possible embodiment of the present disclosure, the first coordination information is carried through SCI, DCI, or RRC signaling.

In a possible embodiment of the present disclosure, when the first coordination information further includes the RSRP information, the resource set corresponding to the time-frequency resource indication information carried in the first coordination information is indicated through SCI, and the RSRP information is indicated through RRC signaling.

It should be appreciated that, the information processing device in the embodiments of the present disclosure is used to implement all the steps of the above-mentioned method with a same technical effect, which will not be further particularly defined herein.

Figure 7:
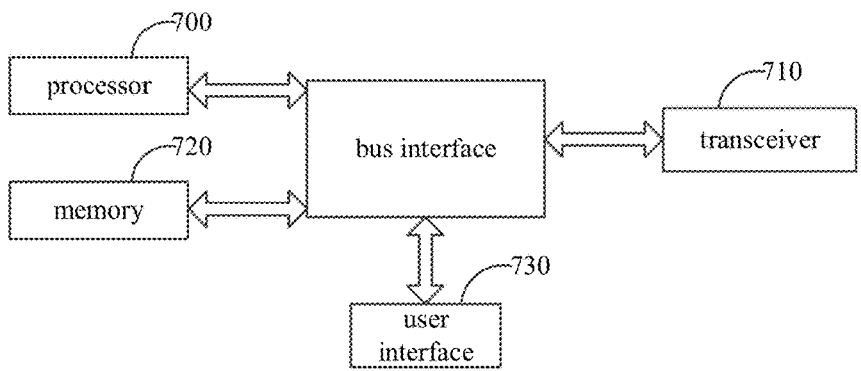
FIG. 7 is another schematic view showing the information processing device according to an embodiment of the present disclosure.

As shown in FIG. 7, the present disclosure further provides in some embodiments an information processing device for a second terminal, which includes a processor 700, a memory 720 and a transceiver 710. The processor 700 is configured to read a program in the memory 720, so as to: receive first coordination information transmitted by a first terminal; and perform resource selection in accordance with the first coordination information. The first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict. The transceiver 710 is configured to receive and transmit data under the control of the processor 700.

In FIG. 7, bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. A bus interface may be provided, and the transceiver 710 may consist of a plurality of elements, i.e., a transmitter and a receiver for communication with any other devices over a transmission medium. With respect to different terminals, a user interface 730 may also be provided for devices which are to be arranged inside or outside the terminal, and these devices may include but not limited to a keypad, a display, a speaker, a microphone and a joystick.

The processor 700 may take charge of managing the bus architecture as well as general processings. The memory 720 may store therein data for the operation of the processor 700.

In a possible embodiment of the present disclosure, the processor 700 is a CPU, an ASIC, an FPGA or a CPLD. The processor may also use multi-core architecture.

The processor is configured to call the computer program in the memory to implement the above-mentioned method in accordance with obtained executable instructions. The processor may also be physically separated from the memory.

In a possible embodiment of the present disclosure, the first resource set is a resource set preferred by the second terminal for the Sidelink communication, and the second resource set is a resource set not preferred by the second terminal for the Sidelink communication.

In a possible embodiment of the present disclosure, the resource set corresponding to the time-frequency resource indication information carried in the first coordination information is indicated by the first terminal through at least one bit.

In a possible embodiment of the present disclosure, the processor 700 is further configured to determine the resource set corresponding to the time-frequency resource indication information carried in the first coordination information in accordance with the at least one bit.

In a possible embodiment of the present disclosure, the first coordination information further includes at least one of RSRP information, RSRP threshold information, priority information, or zone identity information of at least one resource in at least one of the first resource set, the second resource set or the third resource set.

In a possible embodiment of the present disclosure, the RSRP information is RSRP information of a resource meeting a first predetermined condition, and the RSRP information includes RSRP intensity information or RSRP bitmap information.

In a possible embodiment of the present disclosure, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

In a possible embodiment of the present disclosure, the processor 700 is further configured to receive the first coordination information carried through any one of SCI, DCI or signaling.

In a possible embodiment of the present disclosure, when the first coordination information further includes the RSRP information, the processor 700 is further configured to receive the resource set corresponding to the time-frequency resource indication information carried in the first coordination information indicated through SCI, and receive the RSRP information indicated through RRC signaling.

It should be appreciated that, the information processing device in the embodiments of the present disclosure is used to implement all the steps of the above-mentioned method with a same technical effect, which will not be further particularly defined herein.

Figure 8:
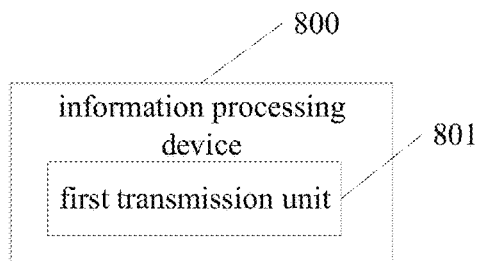
FIG. 8 is yet another schematic view showing the information processing device according to an embodiment of the present disclosure.

As shown in FIG. 8, the present disclosure further provides in some embodiments an information processing device for a first terminal, which includes a first transmission unit 801 configured to transmit first coordination information to a second terminal. The first coordination information is used by the second terminal to perform resource selection in accordance with the first coordination information, the first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

In a possible embodiment of the present disclosure, the first resource set is a resource set preferred by the second terminal for the Sidelink communication, and the second resource set is a resource set not preferred by the second terminal for the Sidelink communication.

In a possible embodiment of the present disclosure, the resource set corresponding to the time-frequency resource indication information carried in the first coordination information is indicated through at least one bit.

In a possible embodiment of the present disclosure, one bit is used to indicate that the time-frequency resource indication information carried in the first coordination information is the time-frequency resource indication information of the first resource set or the time-frequency resource indication information of the second resource set; or two bits are used to indicate that the time-frequency resource indication information carried in the first coordination information is the time-frequency resource indication information of the first resource set, or the time-frequency resource indication information of the second resource set, or the time-frequency resource indication information of the third resource set; or three bits are used to indicate that the time-frequency resource indication information carried in the first coordination information is at least one of the time-frequency resource indication information of the first resource set, the time-frequency resource indication information of the second resource set, or the time-frequency resource indication information of the third resource set.

In a possible embodiment of the present disclosure, the first coordination information further includes at least one of RSRP information, RSRP threshold information, priority information, or zone identity information of at least one resource in at least one of the first resource set, the second resource set or the third resource set.

In a possible embodiment of the present disclosure, the RSRP information is RSRP information of a resource meeting a first predetermined condition, and the RSRP information includes RSRP intensity information or RSRP bitmap information.

In a possible embodiment of the present disclosure, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

In a possible embodiment of the present disclosure, the RSRP intensity information includes RSRP intensity information of a sub-channel or RSRP intensity information of a sub-channel set.

In a possible embodiment of the present disclosure, the first threshold is carried in the first coordination information, configured through first signaling, preconfigured, or indicated through a first indication. The first indication is used to indicate that the first threshold is determined in accordance with a correspondence between a threshold and priority information, and the priority information indicates a priority of a to-be-transmitted data packet or a priority of a user.

In a possible embodiment of the present disclosure, the first coordination information is carried through SCI, DCI, or RRC signaling.

In a possible embodiment of the present disclosure, when the first coordination information further includes the RSRP information, the resource set corresponding to the time-frequency resource indication information carried in the first coordination information is indicated through SCI, and the RSRP information is indicated through RRC signaling.

It should be appreciated that, the information processing device in the embodiments of the present disclosure is used to implement all the steps of the above-mentioned method with a same technical effect, which will not be further particularly defined herein.

Figure 9:
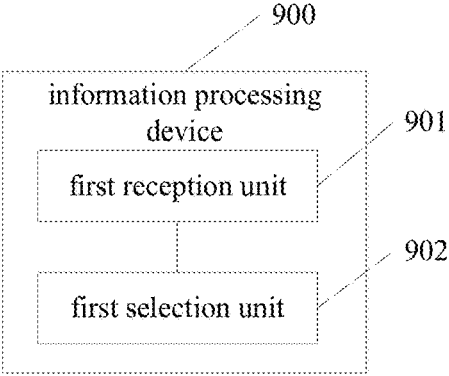
FIG. 9 is still yet another schematic view showing the information processing device according to an embodiment of the present disclosure.

As shown in FIG. 9, the present disclosure further provides in some embodiments an information processing device for a second terminal, which includes: a first reception unit 901 configured to receive first coordination information transmitted by a first terminal; and a first selection unit 902 configured to perform resource selection in accordance with the first coordination information. The first coordination information includes time-frequency resource indication information of at least one of a first resource set, a second resource set or a third resource set, the first resource set is a set of resources preferred to be used by the second terminal for Sidelink communication, the second resource set is a set of resources non-preferred to be used by the second terminal for the Sidelink communication, and the third resource set is a set of resources where there is a resource conflict.

In a possible embodiment of the present disclosure, the first resource set is a resource set preferred by the second terminal for the Sidelink communication, and the second resource set is a resource set not preferred by the second terminal for the Sidelink communication.

In a possible embodiment of the present disclosure, the resource set corresponding to the time-frequency resource indication information carried in the first coordination information is indicated by the first terminal through at least one bit.

In a possible embodiment of the present disclosure, the information processing device further includes a first determination unit configured to determine the resource set corresponding to the time-frequency resource indication information carried in the first coordination information in accordance with the at least one bit.

In a possible embodiment of the present disclosure, the first coordination information further includes at least one of RSRP information, RSRP threshold information, priority information, or zone identity information of at least one resource in at least one of the first resource set, the second resource set or the third resource set.

In a possible embodiment of the present disclosure, the RSRP information is RSRP information of a resource meeting a first predetermined condition, and the RSRP information includes RSRP intensity information or RSRP bitmap information.

In a possible embodiment of the present disclosure, the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

In a possible embodiment of the present disclosure, the first reception unit is further configured to receive the first coordination information carried through any one of SCI, DCI or signaling.

In a possible embodiment of the present disclosure, when the first coordination information further includes the RSRP information, the first reception unit is further configured to receive the resource set corresponding to the time-frequency resource indication information carried in the first coordination information indicated through SCI, and receive the RSRP information indicated through RRC signaling.

It should be appreciated that, the information processing device in the embodiments of the present disclosure is used to implement all the steps of the above-mentioned method with a same technical effect, which will not be further particularly defined herein.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the information processing device in the embodiments of the present disclosure is used to implement all the steps of the above-mentioned method with a same technical effect, which will not be further particularly defined herein.

The present disclosure further provides in some embodiments a readable storage medium storing therein a computer program. The computer program is used to be executed by a processor to implement the above-mentioned method. The readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

The present disclosure have been described above in conjunction with the accompanying drawings, but the present disclosure is not limited to the above-mentioned specific implementations. The above-mentioned specific implementations are only illustrative rather than restrictive. Under the teaching of the present disclosure, a person skilled in the art may make many forms without departing from the principle of the present disclosure and the protection scope of the claims, all of which fall within the protection of the present disclosure.

What is claimed is:

1. An information processing method, comprising:
   transmitting, by a first terminal, first coordination information to a second terminal, wherein the first coordination information is used by the second terminal to perform resource selection in accordance with the first coordination information,
   wherein the first coordination information comprises time-frequency resource indication information of at least one of a first resource set, a second resource set or a third resource set;
   the first resource set is a set of resources preferred to be used by the second terminal for Sidelink communication;
   the second resource set is a set of resources non-preferred to be used by the second terminal for the Sidelink communication;
   the third resource set is a set of resources where there is a resource conflict;
   wherein the resource set corresponding to the time-frequency resource indication information carried in the first coordination information is indicated through at least one bit,
   wherein one bit is used to indicate that the time-frequency resource indication information carried in the first coordination information is the time-frequency resource indication information of the first resource set or the time-frequency resource indication information of the second resource set; wherein 0 represents that the time-frequency resource indication information of the first resource set is carried, and 1 represents that the time-frequency resource indication information of the second resource set is carried.

2. The information processing method according to claim 1, wherein the first resource set is a resource set preferred by the second terminal for the Sidelink communication, and the second resource set is a resource set not preferred by the second terminal for the Sidelink communication.

3. The information processing method according to claim 1, wherein the first coordination information further comprises at least one of the followings of at least one sub-channel or sub-channel set in at least one of the first resource set, the second resource set or the third resource set:

Reference Signal Received Power (RSRP) information, RSRP threshold information, priority information, or zone identity information.

4. The information processing method according to claim 3, wherein the RSRP information is RSRP information of a resource meeting a first predetermined condition;

the RSRP information comprises RSRP intensity information or RSRP bitmap information.

5. The information processing method according to claim 4, wherein the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

6. The information processing method according to claim 5, wherein the first threshold is:

carried in the first coordination information, or configured through first signaling, or preconfigured, or indicated through a first indication, wherein the first indication is used to indicate that the first threshold is determined in accordance with a correspondence between a threshold and priority information, and the priority information indicates a priority of a to-be-transmitted data packet or a priority of a user.

7. The information processing method according to claim 1, wherein the first coordination information is carried through any one of:

Sidelink Control Information (SCI);

Downlink Control Information (DCI); or

Radio Resource Control (RRC) signaling.

8. An information processing method, comprising:

receiving, by a second terminal, first coordination information transmitted by a first terminal;

performing, by the second terminal, resource selection in accordance with the first coordination information, wherein the first coordination information comprises time-frequency resource indication information of at least one of a first resource set, a second resource set or a third resource set;

the first resource set is a set of resources preferred to be used by the second terminal for Sidelink communication;

the second resource set is a set of resources non-preferred to be used by the second terminal for the Sidelink communication;

the third resource set is a set of resources where there is a resource conflict;

wherein the resource set corresponding to the time-frequency resource indication information carried in the first coordination information is indicated by the first terminal through at least one bit;

wherein one bit is used to indicate that the time-frequency resource indication information carried in the first coordination information is the time-frequency resource indication information of the first resource set or the time-frequency resource indication information of the second resource set; wherein 0 represents that the time-frequency resource indication information of the first resource set is carried, and 1 represents that the time-frequency resource indication information of the second resource set is carried.

9. The information processing method according to claim 8, wherein the first resource set is a resource set preferred by the second terminal for the Sidelink communication, and the second resource set is a resource set not preferred by the second terminal for the Sidelink communication.

10. The information processing method according to claim 8, wherein prior to performing, by the second terminal, the resource selection in accordance with the first coordination information, the information processing method further comprises:

determining the resource set corresponding to the time-frequency resource indication information carried in the first coordination information in accordance with the at least one bit.

11. The information processing method according to claim 8, wherein the first coordination information further comprises at least one of the followings of at least one sub-channel or sub-channel set in at least one of the first resource set, the second resource set or the third resource set:

RSRP information, RSRP threshold information, priority information, or zone identity information.

12. The information processing method according to claim 11, wherein the RSRP information is RSRP information of a resource meeting a first predetermined condition;

the RSRP information comprises RSRP intensity information or RSRP bitmap information, wherein the RSRP information is RSRP intensity information of at least one resource with a highest RSRP intensity; or the RSRP information is RSRP intensity information of at least one resource with a lowest RSRP intensity; or the RSRP information is RSRP bitmap information of at least one resource whose RSRP intensity is greater than or equal to a first threshold; or the RSRP information is RSRP bitmap information of at least one resource whose RSRP intensity is smaller than the first threshold.

13. The information processing method according to claim 11, wherein the receiving, by the second terminal, the first coordination information transmitted by the first terminal comprises:

receiving, by the second terminal, the first coordination information carried through any one of SCI, DCI or signaling.

14. An information processing device for a first terminal, comprising a memory, a transceiver and a processor, wherein the memory is configured to store therein a computer program, the transceiver is configured to transmit and receive data under the control of the processor, the processor is configured to read the computer program in the memory to:

transmit first coordination information to a second terminal, wherein the first coordination information is used by the second terminal to perform resource selection in accordance with the first coordination information, wherein the first coordination information comprises time-frequency resource indication information of at least one of a first resource set, a second resource set or a third resource set;

the first resource set is a set of resources preferred to be used by the second terminal for Sidelink communication;

the second resource set is a set of resources non-preferred to be used by the second terminal for the Sidelink communication;

the third resource set is a set of resources where there is a resource conflict;

wherein the resource set corresponding to the time-frequency resource indication information carried in the first coordination information is indicated through at least one bit, wherein one bit is used to indicate that the time-frequency resource indication information carried in the first coordination information is the time-frequency resource indication information of the first resource set or the time-frequency resource indication information of the second resource set; wherein 0 represents that the time-frequency resource indication information of the first resource set is carried, and 1 represents that the time-frequency resource indication information of the second resource set is carried.

15. The information processing device according to claim 14, wherein the first resource set is a resource set preferred by the second terminal for the Sidelink communication, and the second resource set is a resource set not preferred by the second terminal for the Sidelink communication.

16. The information processing device according to claim 14, wherein the first coordination information further comprises at least one of the followings of at least one sub-channel or sub-channel set in at least one of the first resource set, the second resource set or the third resource set:

RSRP information, RSRP threshold information, priority information, or zone identity information.

17. An information processing device for a second terminal, comprising a memory, a transceiver and a processor, wherein the memory is configured to store therein a computer program, the transceiver is configured to transmit and receive data under the control of the processor, the processor is configured to read the computer program in the memory to:

receive first coordination information transmitted by a first terminal;

perform resource selection in accordance with the first coordination information, wherein the first coordination information comprises time-frequency resource indication information of at least one of a first resource set, a second resource set or a third resource set;

the first resource set is a set of resources preferred to be used by the second terminal for Sidelink communication;

the second resource set is a set of resources non-preferred to be used by the second terminal for the Sidelink communication;

the third resource set is a set of resources where there is a resource conflict;

wherein the resource set corresponding to the time-frequency resource indication information carried in the first coordination information is indicated by the first terminal through at least one bit;

wherein one bit is used to indicate that the time-frequency resource indication information carried in the first coordination information is the time-frequency resource indication information of the first resource set or the time-frequency resource indication information of the second resource set; wherein 0 represents that the time-frequency resource indication information of the first resource set is carried, and 1 represents that the time-frequency resource indication information of the second resource set is carried.

18. The information processing device according to claim 17, wherein the first resource set is a resource set preferred by the second terminal for the Sidelink communication, and the second resource set is a resource set not preferred by the second terminal for the Sidelink communication.

19. The information processing device according to claim 17, wherein the processor is further configured to determine the resource set corresponding to the time-frequency resource indication information carried in the first coordination information in accordance with the at least one bit.

20. The information processing device according to claim 17, wherein the first coordination information further comprises at least one of the followings of at least one sub-channel or sub-channel set in at least one of the first resource set, the second resource set or the third resource set:

RSRP information, RSRP threshold information, priority information, or zone identity information.

* * * * *